Nov. 10, 1953 W. G. HOELSCHER 2,658,418
SUPPORT FOR CUTTING TOOLS
Filed March 21, 1950 2 Sheets-Sheet 1
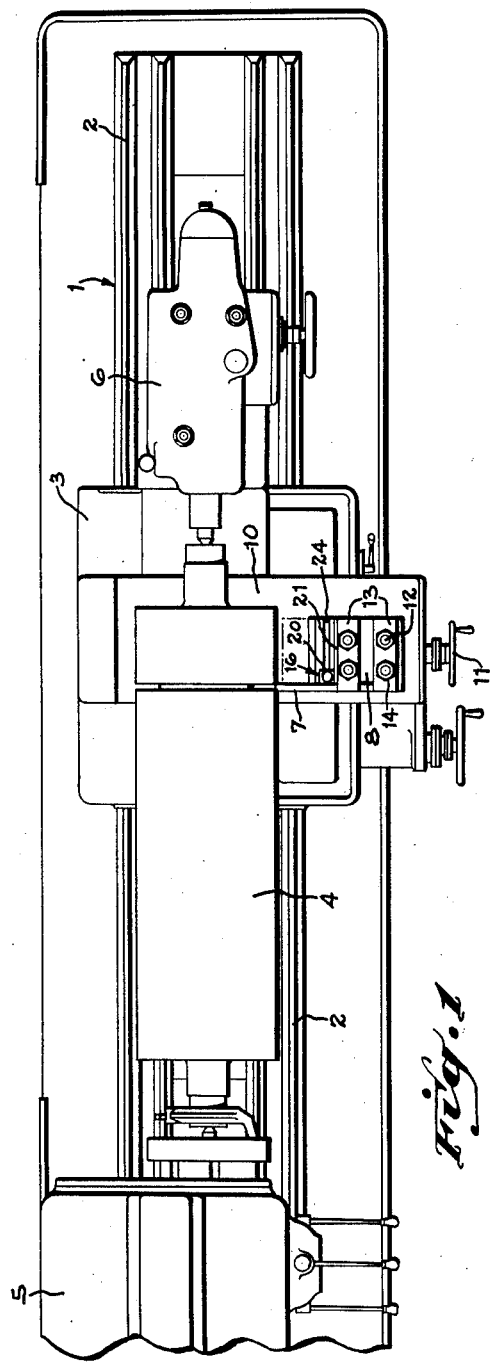
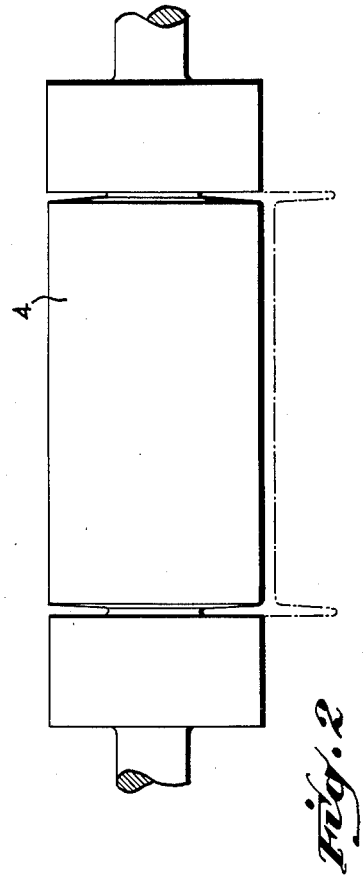
INVENTOR.
William G. Hoelscher
BY
Wood, Arey, Herron & Evans
ATTORNEYS.

Nov. 10, 1953  W. G. HOELSCHER  2,658,418
SUPPORT FOR CUTTING TOOLS
Filed March 21, 1950  2 Sheets-Sheet 2
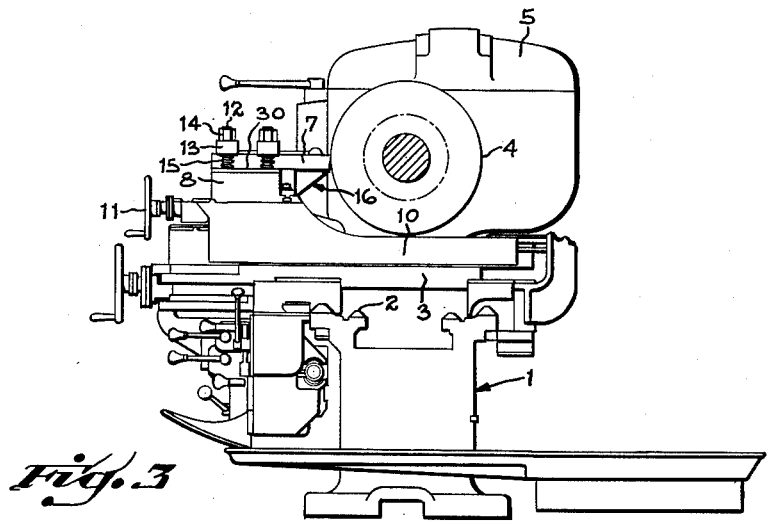
Fig. 3
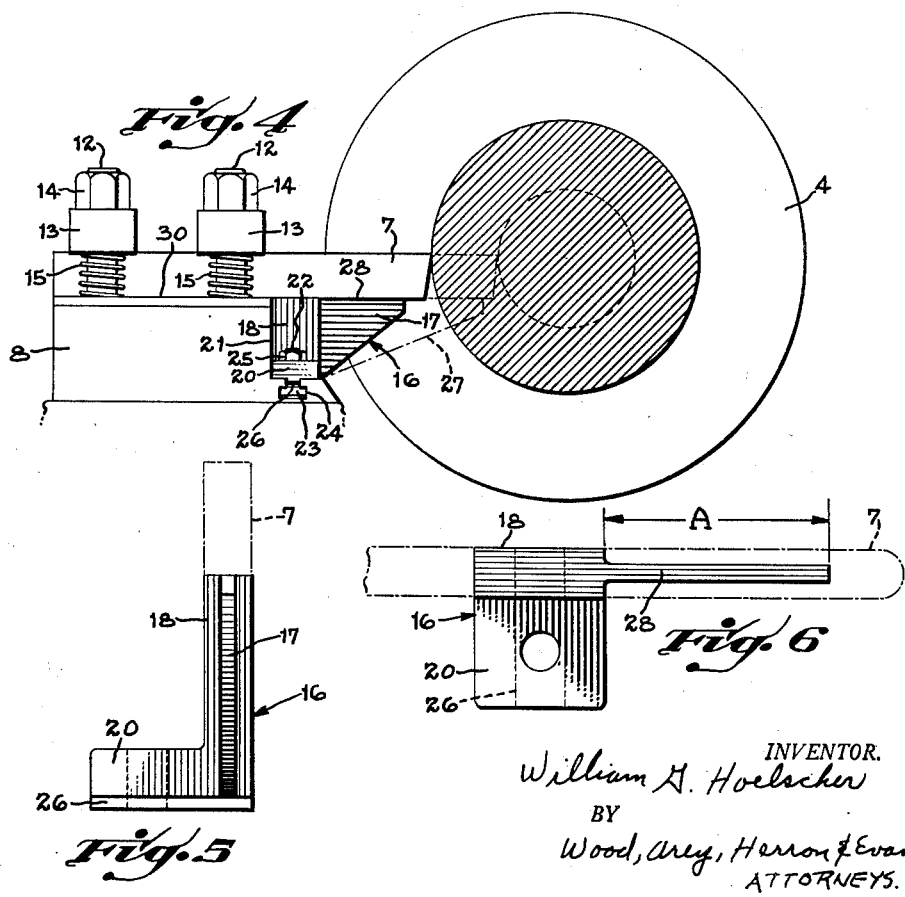
Fig. 4
Fig. 5
Fig. 6
INVENTOR.
William G. Hoelscher
BY
Wood, Arey, Herron & Evans
ATTORNEYS.

Patented Nov. 10, 1953

2,658,418

UNITED STATES PATENT OFFICE 2,658,418

SUPPORT FOR CUTTING TOOLS

William G. Hoelscher, Cincinnati, Ohio, assignor to The American Tool Works Co., Cincinnati, Ohio Application March 21, 1950, Serial No. 151,022

2 Claims. (Cl. 82—36)

This invention relates to a structure for supporting rigidly the extended portion of a cutting tool and is intended particularly for supporting relatively long, slender lathe cutting tools used in turning workpieces having deep narrow grooves. The improved structure consists of a tool holder and an auxiliary support bracket socketed within and cooperating with the holder to buttress the end of the tool which extends from the holder; the structure is especially adapted for turning and grooving large diameter work, for example, forming rolls which are utilized in the steel industry in rolling structural steel I-beams, channels and similar sections. Rolls of this type are fabricated in pairs having mating grooves which delineate in cross section the shape of the structural member when the rollers are installed in pairs in the rolling mill and the grooves are exceedingly narrow in proportion to their depth due to the cross section of the various shapes to be rolled.

When the forming rolls are machined on a lathe, it is necessary in order to cut the grooves, to utilize an elongated cutting tool which is clamped upon a tool holder in the usual manner but with a far greater than normal portion of its length projecting in cantilever fashion from the holder. The projected length of the tool is governed by the diameter of the roll and the depth of grooves to be formed; consequently, as the diameter and groove depth increase, the forces imposed upon the extended end of the tool increase proportionately. It is the practice to fabricate the rolls from hard cast iron or steel which is extremely difficult to machine under normal conditions. Therefore, the problem of supporting the roll forming tool is a critical one; if the projecting portion of the tool is unsupported, the tool will tend to chatter and, if fed into the work rapidly, there is likelihood of breakage.

A primary object of the invention has been to provide a structure which rigidly buttresses the extended portion of the cutting tool in a vertical direction so as to render a relatively long, slender grooving tool capable of withstanding extremely high cutting pressures without breakage or chatter and thereby to make practical the turning of forming rolls and similar deep grooved workpieces of large diameter from hard materials which are difficult to machine.

Briefly, the support structure constitutes a tool holder block having clamps adapted to clamp a cutting tool securely upon its upper surface, combined with an auxiliary tool support bracket which is generally triangular in shape arranged to be mounted within a complementary seat formed at the front of the block so as to extend forwardly as a buttress beneath and in contact with the projected portion of the cutting tool. By virtue of the buttress shape of the bracket, combined with the support derived from the holder block, a high degree of rigidity is provided while the bracket itself is less than the width of the cutting tool which it supports to permit the turning of exceptionally narrow grooves without interference by the support bracket. In its preferred arrangement, the cutting tool is mounted by means of clamping bars which clamp the rearward end of the cutting tool rigidly upon the top surface of the holder block with the tool extending in cantilever fashion from the block toward the workpiece. Beneath the projected portion of the cutting tool, the block is recessed to provide a right angular seat for the bottom and side of the support bracket to absorb the forces imposed on the bracket and, in addition, the seat is slotted to provide a lateral slot for adjustably clamping the bracket to the block. In this manner, the cutting tool and its support bracket are secured individually to the tool holder block to permit the bracket to be adjusted laterally with respect to the width of the cutting tool and to permit the cutting tools to be replaced upon the holder block without disturbing the bracket. By virtue of this arrangement, the tool holder block, cutting tool and support bracket constitute substantially a self-contained unit capable of absorbing without distortion the stresses imposed upon the projected portion of the cutting tool with the recessed portion of the holder block cooperating with the bracket to absorb in compression the forces imposed upon the tool.

A further object has been to provide a tool holder and cooperating interchangeable support brackets to accommodate upon the same tool holder block, support brackets which are coextensive with tools of various length. A set of tools and corresponding support brackets for a wide range of groove depths is thus provided and the configuration of the support bracket is substantially the same for each length except that the angle of the buttress portion varies with the length of the bracket. The brackets are installed simply by loosening a single nut which clamps the bracket to the holder block and then sliding the bracket laterally out of engagement with the slot.

The improved structure is disclosed in conjunction with a lathe adapted for roll turning although the structure may be applied without substantial alteration to a number of machines employing cutting tools, for example, planers, shapers and similar structures. Various other advantages of the invention will be apparent to those skilled in the art from the following detailed disclosure of a preferred embodiment of the invention.

In the drawings:

Figure 1 is a top plan view of a roll turning lathe incorporating the improved tool holder and socketed support bracket.

Figure 2 is an enlarged view of one of a pair of rolls for forming I-beams, and representing one of the more difficult roll turning operations because of the depth of the grooves in proportion to their width.

Figure 3 is an end view of the lathe with the tailstock removed, further illustrating the relationship of the tool supporting structure with respect to a roll.

Figure 4 is an enlarged fragmentary view taken from Figure 3, showing the tool holder and support bracket in operating relationship with a workpiece, an elongated cutting tool and complementary interchangeable bracket for an increased groove depth being indicated in broken lines.

Figure 5 is an enlarged front view of the tool support bracket with the tool indicated in broken lines.

Figure 6 is a top plan view of the tool support, the cutting tool being indicated with respect to the bracket by broken lines.

In Figure 1 of the drawings, the improved tool supporting structure is disclosed in connection with a lathe arranged for roll turning. The lathe consists generally of a bed 1 having ways 2 for slidably mounting the carriage 3. The workpiece 4, which in the present instance consists of a forming roll, is supported for rotation between a headstock 5 and a tailstock 6 which are mounted upon the lathe bed. The carriage is translated longitudinally along the bed by the usual feed rod or lead screw (not shown) and the cutting tool 7 is mounted upon a tool holder 8 carried by a cross slide 10 which is adjustable transversely with respect to the carriage. The cross slide, including the holder and tool, may be fed into the work for forming the grooves either by rotating the cross feed hand wheel 11 or by automatic feed depending upon the design of the lathe.

The feed rate of the cutting tool into the work during a grooving cut is relatively slow, being governed by the hardness of the material, recommended cutting speed and other variable factors. The lathe bearing are constructed to withstand heavy turning resistance without vibration or chatter. This cutting tool, in rough turning as well as finishing, is subjected to cutting stress which is sufficient to cause breakage if it is projected without reenforcement against the rotating roll. The likelihood of breakage is particularly true in machining narrow deep grooves, for instance, the grooves for an I-beam forming roll as illustrated in Figure 2.

The grooves forming the flanges of the beam vary with the nominal size of the beam; by way of example, a standard beam having a depth of 27" has 9" flanges, thus each roll requires a groove approximately 4½" deep and ½" wide. The rough cutting tool for such a groove must be less than ½" wide in order to leave sufficient material for one or more finish cuts. One side of the groove usually is tapered to form the taper on the inside surface of the flanges. In cutting such narrow grooves, the cutting tool, which is narrow to begin with, usually is tapered in width rearwardly from its cutting edge to provide clearance between the side of the groove and the projecting shank of the tool. The roughing tool may be fed straight into the work to form the straight side of the groove with the carriage stationary and may be fed in at an angle to form the tapered side of the groove. It will be apparent that it is a critical operation to form grooves of this character without tool breakage if the tool is not provided with extrinsic support, since the tool is of necessity considerably narrower than the finished groove and lacks the strength, due to its projected length, to support itself under adverse operating conditions.

As disclosed most clearly in Figure 4, the tool holder 8 constitutes a block having studs 12 traversing a pair of clamp bars 13 which extend at right angles across the top of the cutting tool. Nuts 14 are threaded upon the upper ends of the studs 12 to force the cutting tool into clamping engagement with the block 8. In order to aid in making adjustments of the cutting tool with respect to its post, springs 15 are placed in compression between the block 8 and clamp bars 13 to force the clamping bars upwardly when the nuts are loosened.

The tool support bracket, indicated generally at 16, consists essentially of a triangular steel buttress plate 17 having a width dimension substantially less than the width of the cutting tool, as indicated in Figures 5 and 6. This plate or web includes at its rearward edge a vertical section 18 having at its lower end, a foot 20 which extends from one side of the section 18 for mounting purposes. The tool support is formed as a one-piece unit preferably by a forging operation, after which the unit is heat-treated to provide toughness. In order to provide an accurate fit with respect to the cutting tool, the bearing surfaces of the support are accurately finished by machine.

As best shown in Figure 4, the tool holder is provided with a right angular recess 21 complementary to the rear portion of bracket 16 to provide a socket for the bracket. The bracket is attached by means of a clamping screw 22 having its head 23 engaged in a T-slot 24 formed in the base of recess 21. Foot 20 is clamped in position by a nut 25 threaded upon the upper end of screw 22 and in clamping engagement against the foot. The lower surface of the foot includes a tongue 26 which projects into the upper portion of the T-slot 24 to guide the tool support bracket with respect to the tool holder. By loosening nut 25, the support bracket can be adjusted accurately in alignment with the cutting tool which is independently clamped to the tool holder by the nuts 14.

By virtue of the angular recess 21 in the tool holder, the rear and bottom edges of the support are closely fitted into the tool holder to derive rigidity and to form a self-contained unit capable of absorbing the stresses within itself. The forces imposed upon the cutting tool are of course concentrated at the outer end of the tool which is presented to the rotating workpiece and, by virtue of the triangular configuration of the buttress plate 17, the cutting tool is rigidly supported against downward deflection and possible breakage. The structure thus protects the tool and, additionally, improves the quality of the work, since it effectively prevents tool deflection or chatter and thereby aids in producing a fine, accurate surface finish.

In order to accommodate the various types of rolls and other contours which must be turned, the tool supporting brackets 16 are furnished with angular buttress webs 17 having length dimensions corresponding to the length of cutting tools required for various grooving operations. The variable length dimension for the webs is indicated at A in Figure 6. The various sizes so furnished are substantial duplicates of the form disclosed except that the angle defined by the edge 27 of buttress web 17 will vary with the length of the web, as indicated by broken lines in Figure 4. In order to provide an adequate bearing surface, the upper surface 28 of web 17 must be precisely related to the upper surface 30 of the tool holder block so that contact is maintained between the web bearing surface 28 and the underside of the cutting tool.

Having described my invention, I claim:

1. A structure for mounting and reenforcing the cutting tool of a lathe or the like with respect to a workpiece comprising, a tool holder block adapted to mount a cutting tool with a portion of the tool projected beyond the holder toward the workpiece, a buttress member disposed against the projected portion of the cutting tool, a clamp adapted to secure a portion of the cutting tool upon the upper surface of the holder block, the holder block having a recess beneath the projected portion of the cutting tool and having a clamping slot extending substantially at right angles to the cutting tool, a second clamp engaged in the said slot and connected to the buttress member and adapted to secure the buttress member to the holder, the said second clamp being constructed and arranged to slidably engage the slot and thereby provide adjustment of the buttress member laterally with respect to the projected portion of the cutting tool.

2. A structure for mounting the cutting tool of a lathe or the like with respect to a workpiece comprising, a tool holder block adapted to be mounted on a lathe, clamping means constructed and arranged to clamp a cutting tool upon the upper surface of the tool holder block with a portion of the cutting tool projecting forwardly from the holder block toward the workpiece, a tool supporting bracket disposed beneath the projected portion of the cutting tool to support the same, the tool holder block having a right angular recess at its forward face beneath the projected portion of the cutting tool, the tool supporting bracket having a complementary right angular rearward portion adapted to seat within the right angular recess of the tool holder block and having a buttress portion substantially coextensive with the cutting tool to support the projected portion thereof, the tool holder block having an elongated slot formed in said right angular recess and extending substantially at right angles to the cutting tool, and a second clamp member shiftably engaged in said slot and connected to the tool supporting bracket, the second clamp member being adapted to clamp the tool supporting bracket rigidly within the right angular recess and being adapted to provide selective lateral positioning of the tool supporting bracket relative to the cutting tool, the right angular recess being adapted to form abutment surfaces to oppose the forces imposed in compression upon the buttress portion of the support bracket by the cutting tool.

WILLIAM G. HOELSCHER.

References Cited in the file of this patent

UNITED STATES PATENTS

| Number | Name | Date |
|---|---|---|
| 679,297 | Coburn | July 30, 1901 |
| 1,187,099 | Rogers | June 13, 1916 |
| 1,738,912 | Luers | Dec. 10, 1929 |
| 1,778,494 | Gronwald | Oct. 14, 1930 |
| 1,863,131 | Taylor | June 14, 1932 |

FOREIGN PATENTS

| Number | Country | Date |
|---|---|---|
| 522,968 | Great Britain | July 2, 1940 |